No. 611,653. Patented Oct. 4, 1898.
D. C. STANDIFORD.
MILK REFRIGERATING AND DELIVERY APPARATUS.
(Application filed Nov. 19, 1897.)
(No Model.)
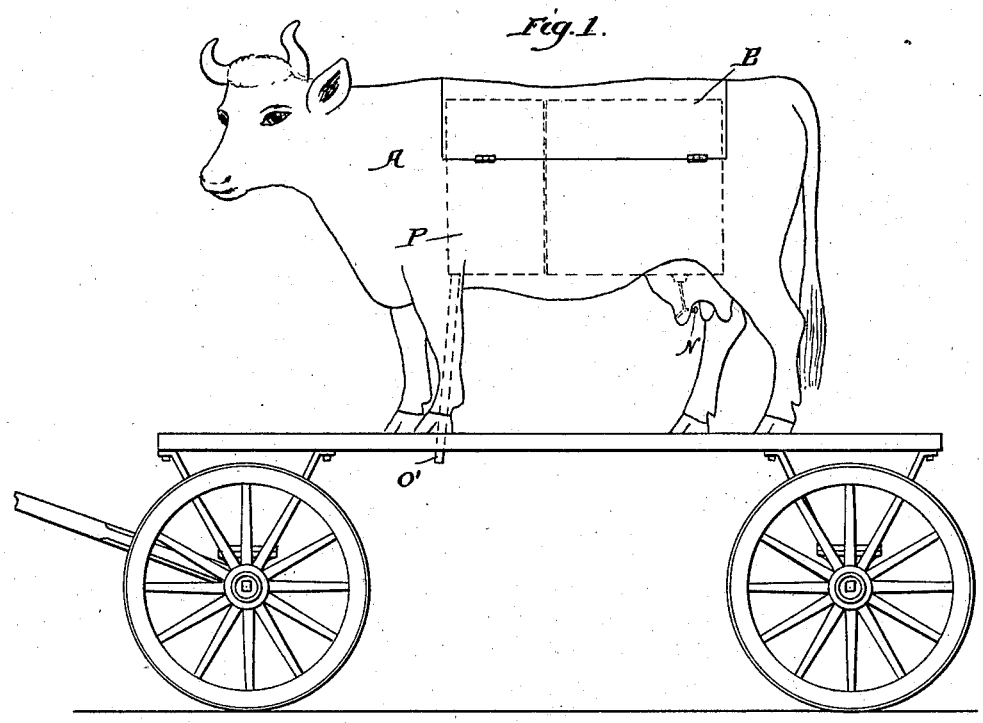
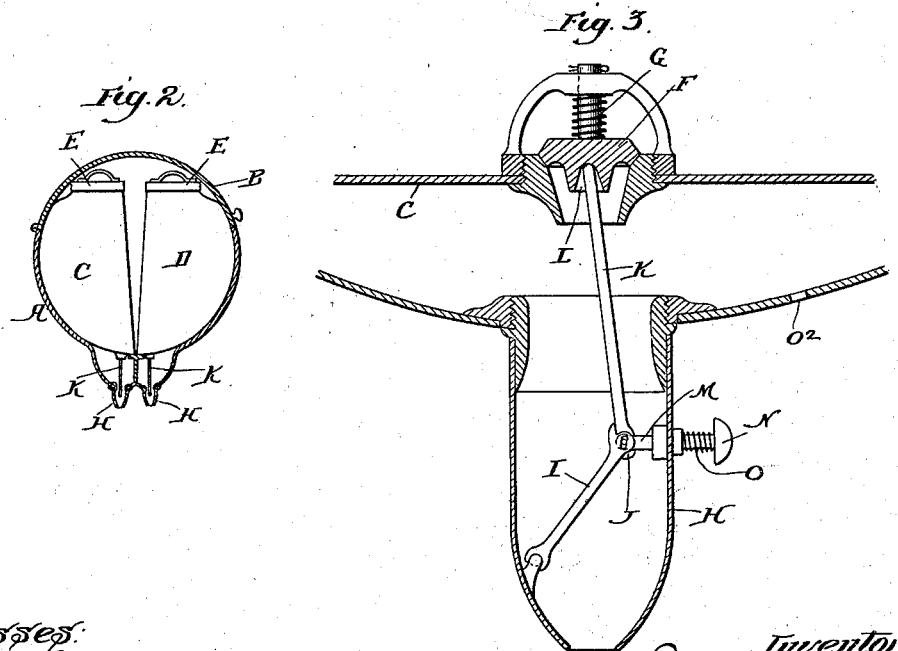

UNITED STATES PATENT OFFICE.

DAVID C. STANDIFORD, OF BALTIMORE, MARYLAND.

MILK REFRIGERATING AND DELIVERY APPARATUS.

SPECIFICATION forming part of Letters Patent No. 611,653, dated October 4, 1898.

Application filed November 19, 1897. Serial No. 659,130. (No model.)

*To all whom it may concern:*

Be it known that I, DAVID C. STANDIFORD, a citizen of the United States, residing at Baltimore, in the State of Maryland, have invented a new and useful Improvement in Milk Refrigerators and Delivery Apparatus, of which the following is a full, clear, and exact specification.

My invention relates to a new and useful improvement in milk refrigerators and delivery apparatus, and has for its object to provide a device of this description which shall resemble a life-size cow and in which the milk may be stored and kept at the proper temperature by the use of ice and from which said milk may be drawn as occasion requires after the manner of milking a cow.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is an elevation of my improvement, showing the apparatus as representing a cow mounted upon a truck in order that it may be conveniently drawn from one locality to another; Fig. 2, a cross-section of the body of the apparatus, taken through the teats; and Fig. 3, an enlarged view of the valve mechanism and one of the teats, illustrating the manner of withdrawing the milk from one of the receptacles.

In carrying out my invention as here embodied, A represents the refrigerator, which should be a vivid representation of a cow of life size and having a door B in either or both sides thereof in order that access may be gained thereto.

Within the body of the apparatus are the receptacles or compartments C and D, each of which is provided with a cover E and adapted to contain the desired quantity of milk, and by the use of these two receptacles two qualities of milk may be stored at the same time, such as sweet milk and buttermilk. In the bottom of each of the receptacles is located a valve F, having a spring G for normally holding it in place upon its seat, so as to prevent the downflowing of the milk from the receptacle, and each of the teats H has pivoted therein the toggle-lever I, which is connected at J to the lift-rod K, the upper end of the latter projecting within a recess L in the bottom of the valve, so that when this rod is forced upward the valve will be raised from off its seat and the milk permitted to flow downward through the teat, the latter serving as a spout to deliver the milk to a receptacle properly placed. A stem M is also pivoted at J to the toggle-lever and passes through one side of the teat, terminating in the button N, back of which is arranged a coiled spring O, whereby this stem is normally forced outward, leaving the valve in its closed position. A waste-pipe O' leads downward through the fore leg, through which the water from the ice passes, and a vent $O^2$ is provided to prevent back pressure in the outflow of the milk. From this it will be seen that when it is desired to withdraw milk from either of the receptacles C or D the proper teat is grasped and pressure brought to bear upon the button N, thereby forcing the toggle-lever inward, which will bring about the upward movement of the lift-rod K and in turn the opening of the valve P, as will be readily understood. By the proper manipulation of this portion of the device a realistic representation may be had of the milking of a cow.

The portion of the body of the apparatus which is not occupied by the receptacles C and D may be utilized for the storing of ice to maintain the milk at a proper temperature or a separate compartment may be arranged within the body, as indicated by the dotted lines at P, for the reception of this ice.

When my improved apparatus is mounted upon the truck, as here shown, it may be easily conveyed from place to place or drawn through the streets for the delivery of milk in small quantities and will attract considerable attention by its realistic appearance.

Of course my improvement may be used for the storing and delivery of any liquid—as, for instance, cider.

Having thus fully described my invention, what I claim as new and useful is—

1. A body representing a cow, having a bag and teats, compartments in the body provided with valved openings registering with the teats, a lift-rod for each valve, a toggle-lever pivoted to each rod, push-rods protruding through the sides of the teats for operating the lift-rods and springs for holding the rods in their normal position as and for the purpose described.

2. A body representing a cow having a bag and teats, compartments therein, having valved openings, a lift-rod for each of the valves, toggle-levers pivoted to the lift-rods, push-rods protruding through the side of the teat and pivoted to the lift-rod and toggle-lever at their junction with each other, as and for the purpose described.

In testimony whereof I have hereunto affixed my signature in the presence of two subscribing witnesses.

DAVID C. STANDIFORD.

Witnesses:
JAS. W. CLAYTON,
R. MORGAN WHITEFORD.